Patented Oct. 24, 1944

2,361,156

UNITED STATES PATENT OFFICE 2,361,156

MANUFACTURE OF ALTERNATING CURRENT RECTIFIERS OF THE SELENIUM TYPE

Leslie Ernest Thompson and Alexander Jenkins, London, England, assignors, by mesne assignments, to The Union Switch and Signal Company, Swissvale, Pa., a corporation of Pennsylvania No Drawing. Application January 8, 1943, Serial No. 471,736. In Great Britain January 21, 1942

2 Claims. (Cl. 175—366)

This invention relates to the manufacture of alternating current rectifiers of the selenium type comprising a base of or support provided with a layer or coating containing selenium and other substances, a counter electrode being applied on the surface of this layer.

The invention more particularly relates to the manufacture of rectifiers of this character in which the layer or coating contains in addition to the selenium, selenium dioxide and a halogen salt such for example as sodium chloride, one process of manufacture of material of this kind being described in specification of United States Patent No. 2,307,474.

In the manufacture of rectifiers of this type an electric forming process is employed consisting in applying to the rectifier in the reverse direction, after the coating and counter-electrode have been applied, a voltage in the reverse direction which is high relative to the normal voltage at which the rectifier operates, this voltage being sufficient to cause a current of from 50 ma. to 200 ma. to traverse the rectifier in the reverse direction. As a result the resistance in the reverse direction increases somewhat suddenly to a value which is considerably higher than the reverse resistance at the beginning of the forming process, and the present invention has for its object to ensure that a satisfactorily high ultimate reverse resistance shall be obtained as a result of the electric forming above described.

According to the principal feature of the invention a small percentage of water is added to the selenium mixture containing the halogen salt either directly or in the form of selenious acid which forms selenium dioxide and thus renders the addition of a corresponding amount of selenium dioxide itself unnecessary. It is believed that the effect of the addition of water is to vary the action of the chlorine or other halogen content of the mixture but in any case the effect is found to be a considerable increase in the ultimate reverse resistance characteristic of the rectifier.

The amount of added water desirable for this purpose is found by experiment to be somewhat critical in order to improve the general characteristics of the rectifier. For example, whereas by employing selenium dioxide entirely free from moisture, the final reverse resistance was so low as only to require the application of from 2 to 3 volts to obtain the current value above referred to, but the addition of 0.05% of water raises this voltage to from 7 to 8 volts, while an addition of 0.3% of water raises this voltage to from 17 to 18 volts. Higher percentages of added water do not greatly increase the reverse resistance above this value while forward resistance characteristics of the rectifier, on the other hand, rapidly become less favourable so that the addition of approximately 0.3% of water is found to be a preferred value for the added water.

Satisfactory results are also obtained if the mixture contains 1½% of selenious acid and 1½% of selenium dioxide these values corresponding to the equivalent addition of 0.3% of water.

The improved process of the invention is however not limited strictly to the values given above by way of example which may be varied in accordance with the particular composition of the selenium mixture employed.

Having now described our invention, what we claim as new and desire to secure by Letters Patent is:

1. An alternating current rectifier of the selenium type described comprising a base or support provided with a layer or coating of selenium containing selenium dioxide and a non-hydrolyzable halogen salt in which a small percentage of water is added to the selenium mixture containing the non-hydrolyzable halogen salt, either directly or in the form of selenious acid, for the purpose specified.

2. A rectifier as claimed in claim 1 in which 0.3% of water or an equivalent amount of selenious acid is added to the selenium mixture, for the purpose specified.

LESLIE ERNEST THOMPSON.
ALEXANDER JENKINS.